United States Patent
Konta et al.

(10) Patent No.: US 7,487,292 B2
(45) Date of Patent: Feb. 3, 2009

(54) MAGNETIC DISK APPARATUS, CONTROL METHOD AND CONTROL PROGRAM THEREFOR

(75) Inventors: Yoshihito Konta, Kawasaki (JP); Hideo Takahashi, Kawasaki (JP); Hiroaki Ochi, Kawasaki (JP); Yasutake Sato, Kawasaki (JP); Tsukasa Makino, Kawasaki (JP); Norihide Kubota, Kawasaki (JP); Mikio Ito, Kawasaki (JP); Hidejirou Daikokuya, Kawasaki (JP); Kazuhiko Ikeuchi, Kawasaki (JP); Shinya Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 11/214,871

(22) Filed: Aug. 31, 2005

(65) Prior Publication Data
US 2006/0282616 A1 Dec. 14, 2006

(30) Foreign Application Priority Data
Jun. 10, 2005 (JP) ............................ 2005-170283

(51) Int. Cl.
*G06F 13/00* (2006.01)
(52) U.S. Cl. ...................................... 711/114; 711/162
(58) Field of Classification Search .............. 711/114, 711/162
See application file for complete search history.

(56) References Cited

U.S. PATENT DOCUMENTS

| | | | | |
|---|---|---|---|---|
| 6,832,330 | B1 * | 12/2004 | Boudrie et al. | 714/6 |
| 6,834,326 | B1 * | 12/2004 | Wang et al. | 711/114 |
| 6,924,780 | B1 * | 8/2005 | Horst et al. | 345/82 |
| 2005/0166085 | A1 * | 7/2005 | Thompson et al. | 714/6 |
| 2006/0155944 | A1 * | 7/2006 | Kano | 711/161 |
| 2006/0174156 | A1 * | 8/2006 | Balasubramanian | 714/6 |
| 2006/0190682 | A1 * | 8/2006 | Noguchi et al. | 711/114 |
| 2007/0192557 | A1 * | 8/2007 | Kezuka et al. | 711/164 |

FOREIGN PATENT DOCUMENTS

| | | |
|---|---|---|
| JP | 04-205518 | 7/1992 |
| JP | 2004-126850 | 4/2004 |

* cited by examiner

*Primary Examiner*—Reba I Elmore
(74) *Attorney, Agent, or Firm*—Staas & Halsey LLP

(57) ABSTRACT

A magnetic disk apparatus capable of effectively achieving speedup of the response to a read request, a control method and control program therefore are provided. In a control of a magnetic disk apparatus having a RAID configuration in which the same data is written on two disks, a given algorithm is selected from a plurality of different algorithms with respect to the data stored in the disks, read commands are issued to the data stored in the two disks, respectively, according to the selected algorithm and the data that has been read first by the read commands that has been issued to the two disks in a read command issuance step is adopted as read data.

20 Claims, 3 Drawing Sheets

MAGNETIC DISK APPARATUS, CONTROL METHOD AND CONTROL PROGRAM THEREFOR

BACKGROUND OF THE INVENTION

1. Field of the Invention

The present invention relates to a magnetic disk apparatus having a Redundant Arrays of Independent Disks (RAID) configuration such as RAID-1 or RAID-0+1 in which the same data is written on different two disks and a control method and control program for the magnetic disk apparatus and, more particularly, to a speedup of input/output (I/O) response of the magnetic disk apparatus.

2. Description of the Related Art

Among magnetic disk apparatuses having a RAID configuration such as RAID-1 or RAID-0+1 in which the same data is written on different two disks, known is a magnetic disk apparatus that issues the same read command to respective disks when receiving a data read request from a host and adopts the data that responds first to the read command as a result of the command (refer to, for example, Jpn. Pat. Appln. Laid-Open Publication No. 4-205518).

However, different loads are applied to the respective disks, so that response to a read command may differ depending on the algorithm that executes the command in some cases. If a reading operation using a read command is performed according to a uniformly defined algorithm in the above case, the speedup of response cannot effectively be achieved.

SUMMARY OF THE INVENTION

The present invention has been made to solve the above problem, and an object thereof is to provide a magnetic disk apparatus capable of effectively achieving a speedup of the response to a read request, a control method and control program therefore.

To solve the above problem, according to a first aspect of the present invention, there is provided a magnetic disk apparatus having a RAID configuration in which the same data is written on two disks, comprising: a read command issuance section that selects a given algorithm from a plurality of different algorithms with respect to the data stored in the disks and issues read commands to the data stored in the two disks, respectively, according to the selected algorithm; and a data acquisition section that adopts, as read data, the data that has been read first by the read commands that the read command issuance section has issued to the two disks.

In the magnetic disk apparatus according to the present invention, the read command issuance section determines two loads applied on the two disks, selects the algorithms used for read commands to be issued to the disks based on the determined loads, and issues read commands according to the selected algorithms.

In the magnetic disk apparatus according to the present invention, the read command issuance section may issue read commands to the two disks according to the different algorithms. Further, the read command issuance section may issue read commands to the two disks according to the same algorithm. The algorithm may include a first algorithm that issues, to a disk, read commands that access a discrete LBA (logical block address) to be read and a second algorithm that issues a read command that reads consecutive LBAs including an LBA to be read with a single access and, after that, discards unnecessary LBAs.

In the magnetic disk apparatus according to the present invention, the read command issuance section may use a throughput for the disks to determine the load and issue read commands to the disk having a higher load according to the first algorithm. Further, the read command issuance section may use the number of commands to be issued to the disks to determine the load on the disks and issue a read command to the disk having a higher load according to the second algorithm. Further, the read command issuance section may use a throughput for the disks to determine a first load, use the number of commands to be issued to the disks to determine a second load, and select the algorithm based on the first and second loads.

Further, the read command issuance section may select the algorithm based on the differences in the first and second loads between the two disks.

According to a second aspect of the present invention, there is provided a control program for magnetic disk apparatus allowing a computer to execute data read processing of a magnetic disk apparatus having a RAID configuration in which the same data is written on two disks, the program allowing the computer to execute: a read command issuance step that selects a given algorithm from a plurality of different algorithms with respect to the data stored in the disks and issues read commands to the data stored in the two disks, respectively, according to the selected algorithm; and a data acquisition step that adopts, as read data, the data that has been read first by the read commands that the read command issuance step has issued to the two disks.

In the control program for magnetic disk apparatus according to the present invention, the read command issuance step determines two loads applied on the two disks, selects the algorithms used for read commands to be issued to the disks based on the determined loads, and issues read commands according to the selected algorithms.

The read command issuance step may issue read commands to the two disks according to the different algorithms. Further, the read command issuance step may issue read commands to the two disks according to the same algorithm.

Further, in the control program for magnetic disk apparatus according to the present invention, the read command issuance step may use a throughput for the disks to determine the load and issue read commands to the disk having a higher load according to the first algorithm. Further, the read command issuance step may use the number of commands to be issued to the disks to determine the load on the disks and issue a read command to the disk having a higher load according to the second algorithm.

Still further, the read command issuance step may use the throughput for the disks to determine a first load, use the number of commands to be issued to the disks to determine a second load, and select the algorithm based on the first and second loads.

Incidentally, the read command issuance step may select the algorithm based on the differences in the first and second loads between the two disks.

According to a third aspect of the present invention, there is provided a control method for magnetic disk apparatus having a RAID configuration in which the same data is written on two disks, comprising: a read command issuance step that selects a given algorithm from a plurality of different algorithms with respect to the data stored in the disks and issues read commands to the data stored in the two disks, respectively, according to the selected algorithm; and a data acquisition step that adopts, as read data, the data that has been read first by the read commands that the read command issuance step has issued to the two disks.

As described above, according to the present invention, it is possible to effectively achieving speedup of the response to a read request.

DETAILED DESCRIPTION OF THE PREFERRED EMBODIMENTS

An embodiment of the present invention will be described with reference to the accompanying drawings.

Figure 1:
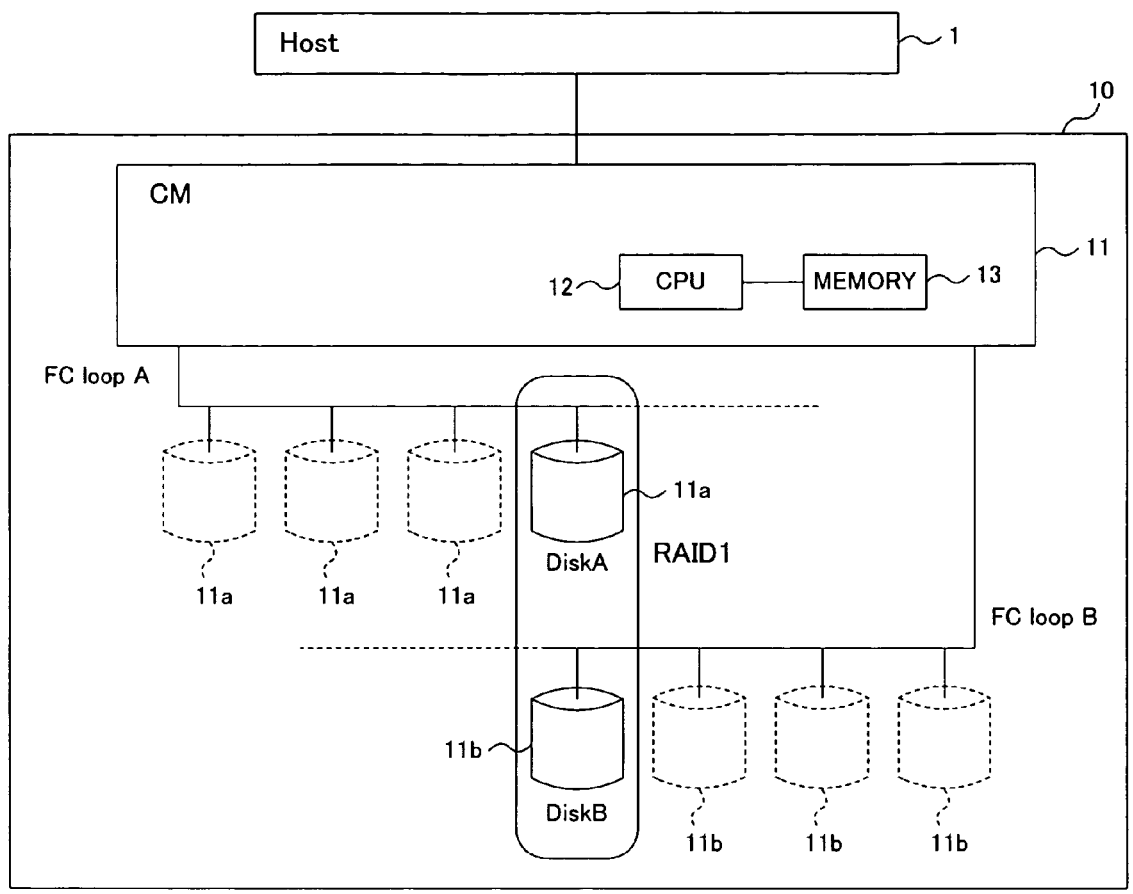
FIG. 1 is a block diagram showing an embodiment of the present invention.

FIG. 1 is a block diagram showing a magnetic disk apparatus according to an embodiment of the present invention. In FIG. 1, the magnetic disk apparatus 10 is connected to a host 1. The magnetic disk apparatus 10 includes a CM (controller module) 11, two FC (fiber channel) loops (FC loops A and B) connected to the CM 11, a plurality of disks 11*a* and 11*b* respectively connected to the FC loops A and B. The CM 11 includes a CPU 12 and a memory 13 and constitutes a read command 120 issuance section and data acquisition section of the present invention.

In this embodiment, although the magnetic disk apparatus 10 has a RAID-1 configuration, the present invention is also applicable to a magnetic disk apparatus having a RAID-1+0 configuration. In FIG. 1, a disk A and disk B consisting the RAID-1 stores the same data.

According to the present embodiment, in this RAID-1 configuration, the CM 11 issues read commands based on different algorithms to read the data stored in the disk A and disk B and transmits the data that has been read first to the host. The algorithms used here are a first algorithm and a second algorithm.

(First Algorithm)

Figure 2:
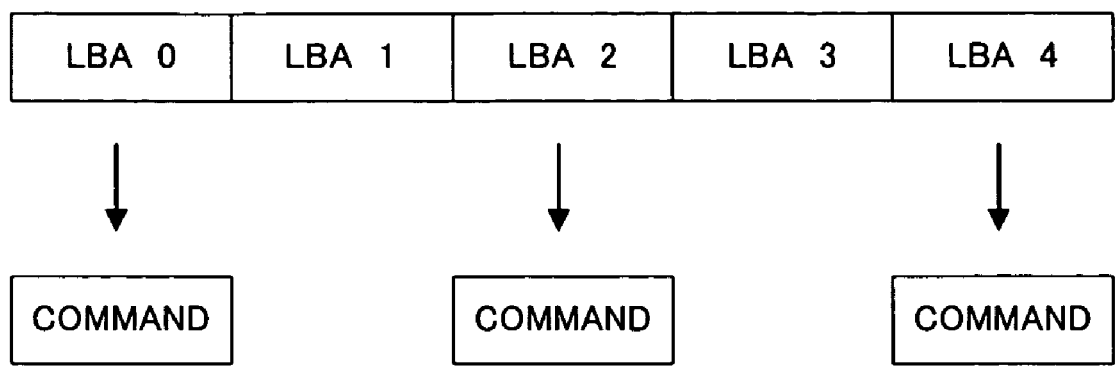
FIG. 2 is an explanatory view showing a first algorithm.

The first algorithm is advantageous in a reading operation in the case where a high load is applied to the FC loop (throughput of the FC loop is high). As shown in FIG. 2, the first algorithm issues, to a disk, read commands that access target discrete LBAs (LBA: logical block address).

In FIG. 2, the disk includes fixed-length (520 byte) blocks called LBA. The CM 11 performs a disk access operation after specifying an access start LBA position and the number of LBAs to be processed.

Assume that a read request is issued for three discrete LBAs (LBA0, LBA2, LBA4) from the host. In this case, according to the first algorithm, the CM discretely issues read commands to the disk after specifying respective LBAs as follows.

First read command:
    access start LBA=0, number of LBAs to be processed=1

Second read command:
    access start LBA=2, number of LBAs to be processed=1

Third read command:
    access start LBA=4, number of LBAs to be processed=1

(Second Algorithm)

Figure 3:
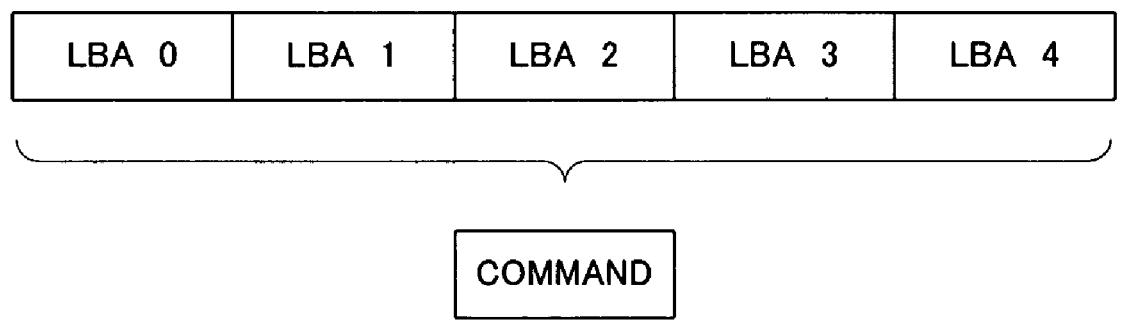
FIG. 3 is an explanatory view showing a second algorithm.

The second algorithm is advantageous in a reading operation in the case where a high load is applied to the disk (a large number of commands are issued to the disk). As shown in FIG. 3, the second algorithm issues a read command that reads consecutive LBAs including target LBAs with a single access and, after that, discards unnecessary LBAs.

In FIG. 3, when, for example, a read request is issued for LBAs 0, 2, and 4 from the host, the CM 11 reads the data corresponding to the LBAs 0 to 4 with a single command from the disk. To be more specific, the CM 11 reads all of the data corresponding to LBAs 0, 1, 2, 3, and 4, and, after that, discards the LBAs 1 and 3 on the CM 11 (discards to a not shown memory called trash buffer).

According to the second algorithm, the CM 11 accesses the disk with a single command in a disk access operation for discrete LBA data, thereby eliminating firmware overhead in the CM 11 and disk. That is, the reduction in the number of read commands reduces firmware overhead. However, as a disadvantage, excess data (LBAs 1 and 3) are read in the second algorithm, contrary to the first algorithm, so that excess data may flow on the FC transmission path between the CM and DISK, resulting in a bottleneck of the FC transmission path.

In the case where the data corresponding to the above LBAs 0, 2, and 4 are read according to the second algorithm, the firmware within the CM 11 sets a parameter for a not-shown FC (fiber channel) chip called QX4 and activates the parameter when an access is made for the disk. Use of an FC segment, which exists in the parameter list, makes it possible to designate the buffer in which the data read from the disk is to be stored.

[Setting for QX4 Made by CM Firmware]
    Command to disk issued by CM:
    Access start LBA=0, number of LBAs to be processed=5FC segments 0x00000208 # data length of LBA0

0xF0000000 # data storage address of LBA0 (head address of data storage buffer)

0x00000208 # data length of LBA1

0xF0000000 # data storage address of LBA1 (head address of Trash buffer)

0x00000208 # data length of LBA2

0xF0000208 # data storage address of LBA2 (head address of data storage buffer+520 byte)

0x00000208 # data length of LBA3

0xF0000000 # data storage address of LBA3 (head address of Trash buffer)

0xF0000410 # data storage address of LBA4 (head address of data storage buffer+1040 byte)

0x00000208 # data length of LBA4

In the present embodiment, read commands following the two algorithms each having an advantage and disadvantage different from each other are selectively used to perform a disk access operation and the data that has been read first is adopted. This configuration enables a data reading operation to be performed more effectively and fast. Here, "selectively used" means in this case that different algorithms or a common algorithm may be used for two disks.

Further, in the present embodiment, in order to utilize the advantages of the first and second algorithms more effectively, load on FC loops (A, B) and load on disks (A, B) are detected and determined, and read commands following the first and second algorithms are assigned to the disk based on the determination result, thereby speeding up a data reading operation. It goes without saying that, in the present invention, assignation of the algorithms may be made based on the detection of only one of the two loads to be described later. Hereinafter, the detection and determination of the load will be described.

(Load on FC Loop: First Load)

The CM 11 always calculates throughputs (M byte/sec) for the disks belonging to the FC loops A and B. The throughputs of the FC loops A and B are used as FC loop load to select the algorithm. Considering only the load on FC loop, although the load on disk to be described later cannot be ignored, it is preferable to issue a read command according to the second algorithm to the disk with a lower throughput (load on FC loop is low) and to issue read commands according to the first algorithm to the disk with a higher throughput (load on FC loop is high).

When, for example, the FC loop for the disk A has a throughput of 40 Mbps and FC loop of the disk B has a throughput of 75 Mbps (here, the load on disk to be described later is ignored), it is preferable to issue a read command to the disk A according to the second algorithm, and to issue read commands to the disk B according to the first algorithm.

(Load on Disk: Second Load)

The CM 11 counts the number of commands that the CM 11 issues to the disks A and B in order to detect (calculate) the load on disk. The numbers of the commands that have been issued to the disks A and B are used as respective disk loads to select the adequate algorithm. Considering only the load on disk, although the load on FC loop described above cannot be ignored, it is preferable to issue read commands according to the first algorithm to the disk to which a smaller number of commands are being issued (load on disk is low), and to issue a read command according to the second algorithm to the disk to which a larger number of commands are being issued (load on disk is high) since the second algorithm may reduce the number of read commands more than the first algorithm does.

When, for example, 35 commands are being issued to the disk A and 50 commands are being issued to the disk B (here, the load on FC loop described above is ignored), it is preferable to select the first algorithm for the disk A. (Case where inconsistency occurs between algorithms selected according to the determination based on FC load and disk load)

It is necessary to define how the algorithms are handled in the case where inconsistency occurs in the determination of selecting the algorithm based on FC load and disk load.

First Example

When determination has been made such that it is preferable to issue a read 235 command according to the second algorithm to the disk A (load on disk A<load on disk B) in view of the FC loop load, and that it is preferable to issue read commands according to the first algorithm to the disk A (load on disk A<load on disk B) in view of the disk load, it is possible to select the algorithm by prioritizing the disk load or FC loop load.

Second Example

For example, the algorithm is selected based on the differences in the FC loop load and disk load between the two disks. In this case, ratios of the differences to the respective loads are calculated, the algorithm selected based on the load having a higher ratio is adopted.

For example, when the number of command issuances is compared between the two disks for the selection based on the disk load, the number of command issuances for one disk is within −5% of that for the other disk, and when the throughput is compared between the two loops for the selection based on the FC loop load, the throughput of one loop is not less than +50% of that of the other loop. In such a case, the algorithm selected according to the determination based on the FC loop load is adopted, and the second algorithm is applied to a disk belonging to the FC loop having a lower load and the first algorithm is applied to a disk belonging to the FC loop having a higher load.

The above descriptions are just an example and how to select the algorithm for what kind of the load value is merely design matters determined based on environment around the apparatus, policy, and the like.

A read command issuance operation according to the present embodiment will be described with reference to the flowchart of FIG. 4.

When a data read instruction is issued from the host, the CM 11 detects the disk load and FC loop load (step S1 and S2). When the detected FC loop load values are both higher than a setting value and the detected disk load values are both lower than a setting value (yes in step S3), the CM 11 issues read commands to the both disks (disks A and B) according to the first algorithm, thereby preventing high-speed data reading operation from being interrupted due to an increase in the FC loop load.

In the case where the determination in step S3 is not affirmative (no in step S3), when the detected FC loop load values are both lower than a setting value and the detected disk load values are both higher than a setting value (yes in step S5), the CM 11 issues read commands to the both disks according to the second algorithm, thereby preventing high-speed data reading operation from being interrupted due to an increase in the disk load.

In the above operation, each of the setting values can be set by appropriately defining the number of commands to be issued and value of throughput.

Next, in the case where the determination in step S5 is not affirmative (no in 275 step S5), when the detected FC loop load value for one disk (for example, disk A) is lower than that for the other disk (disk B) and the detected disk load value of one disk (disk A) is higher than that of the other disk (disk B) (yes in step S7), the CM 11 issues a read command to the one disk (disk A) according to the second algorithm and issues read commands to the other disk (disk B) according to the first algorithm (step S8).

In the case where the determination in step S7 is not affirmative (no in step S7), when the detected FC loop load value for one disk (disk A) is higher than that for the other disk (disk B) and the detected disk load value of one disk (disk A) is lower than that of the other disk (disk B) (yes in step S9), the CM 11 issues read commands to the one disk (disk A) according to the first algorithm and issues a read command to the other disk (disk B) according to the second algorithm.

In the case where the determination in step S9 is not affirmative (no in step S9), read commands are issued according to the abovementioned first example (determination is made using the load having higher priority) or second example (the load to be adopted is determined using a ratio of the difference).

The above operation denotes a read command issuance operation and, as described above, the CM adopts the data that responds first to the read command that has been issued to the two disks and transmits it to the host.

While the embodiment of the present invention has been described above, the present invention is not limited to the above embodiment. For example, the CM may issue a read command according to the two algorithms without detecting the load and transmit the data that responds first to the host.

Further, in the case of detecting the load, it is possible to select the algorithm by adopting only one of the FC loop load and disk load.

Figure 4:
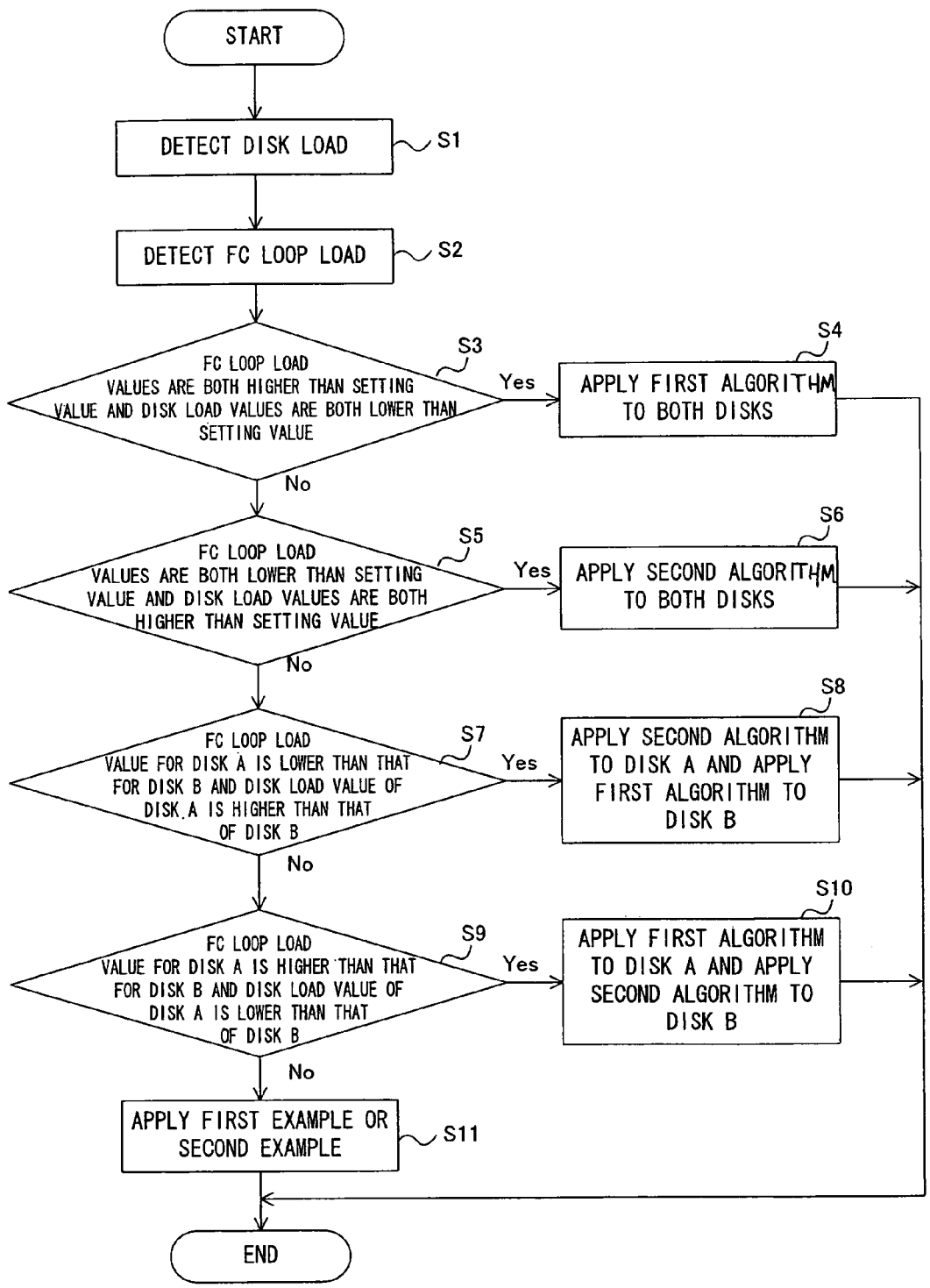
FIG. 4 is a flowchart showing a read command issuance process performed by a CM.

When a program executing the above operation shown in FIG. 4 is stored in a computer-readable storage medium as a control program of the magnetic disk apparatus, it is possible to allow the computer to execute a control method for the magnetic disk. The computer-readable recording medium mentioned here includes: a portable storage medium such as a CD-ROM, a flexible disk, a DVD disk, a magneto-optical disk, or an IC card; a database that holds computer program; another computer and database thereof; and a transmission medium on a network line.

What is claimed is:

1. A magnetic disk apparatus having a RAID configuration in which the same data is written on two disks, comprising:
    a read command issuance section that selects an algorithm from a first algorithm that relates to the size of a load on a fiber channel (FC) loop and a second algorithm that relates to the size of a load applied to the magnetic disk apparatus and issues read commands to data stored in the two disks, respectively, according to the selected algorithm; and
    a data acquisition section that adopts, as read data, the data that has been read first by the read commands that the read command issuance section has issued to the two disks.

2. The magnetic disk apparatus according to claim 1, wherein
    the read command issuance section determines two loads applied on the two disks, selects the algorithms used for read commands to be issued to the disks based on the determined loads, and issues read commands according to the selected algorithms.

3. The magnetic disk apparatus according to claim 2, wherein
    the read command issuance section issues read commands to the two disks according to the different algorithms.

4. The magnetic disk apparatus according to claim 2, wherein
    the read command issuance section issues read commands to the two disks according to the same algorithm.

5. The magnetic disk apparatus according to claim 1, wherein
    the algorithm includes a first algorithm that issues, to a disk, read commands that access a discrete LBA (logical block address) to be read and a second algorithm that issues a read command that reads consecutive LBAs including an LBA to be read with a single access and, after that, discards unnecessary LBAs.

6. The magnetic disk apparatus according to claim 2, wherein
    the read command issuance section uses a throughput for the disks to determine the load and issues read commands to the disk having a higher load according to the first algorithm.

7. The magnetic disk apparatus according to claim 2, wherein
    the read command issuance section uses the number of commands to be issued to the disks to determine the load on the disks and issues a read command to the disk having a higher load according to the second algorithm.

8. The magnetic disk apparatus according to claim 2, wherein
    the read command issuance section uses a throughput for the disks to determine a first load, uses the number of commands to be issued to the disks to determine a second load, and selects the algorithm based on the first and second loads.

9. The magnetic disk apparatus according to claim 6, wherein
    the read command issuance section selects the algorithm based on the differences in the first and second loads between the two disks.

10. A computer-readable medium recording a control program for a magnetic disk apparatus allowing a computer to execute data read processing of a magnetic disk apparatus having a RAID configuration in which the same data is written on two disks,
    the program allowing the computer to execute:
    a read command issuance step that selects an algorithm from a first algorithm that relates to the size of a load on a fiber channel (FC) loop and a second algorithm that relates to the size of a load applied to the magnetic disk apparatus and issues read commands to data stored in the two disks, respectively, according to the selected algorithm; and
    a data acquisition step that adopts, as read data, the data that has been read first by the read commands that the read command issuance step has issued to the two disks.

11. The computer-readable medium according to claim 10, wherein
    the read command issuance step determines two loads applied on the two disks, selects the algorithms used for read commands to be issued to the disks based on the determined loads, and issues read commands according to the selected algorithms.

12. The computer-readable medium according to claim 10, wherein
    the read command issuance step issues read commands to the two disks according to the different algorithms.

13. The computer-readable medium according to claim 10, wherein
    the read command issuance step issues read commands to the two disks according to the same algorithm.

14. The computer-readable medium according to claim 10, wherein
    the algorithm includes a first algorithm that issues, to a disk, read commands that access a discrete LBA (logical block address) to be read and a second algorithm that issues a read command that reads consecutive LBAs including an LBA to be read with a single access and, after that, discards unnecessary LBAs.

15. The computer-readable medium according to claim 11, wherein
    the read command issuance step uses a throughput for the disks to determine the load and issues read commands to the disk having a higher load according to the first algorithm.

16. The computer-readable medium according to claim 11, wherein
    the read command issuance step uses the number of commands to be issued to the disks to determine the load on the disks and issues a read command to the disk having a higher load according to the second algorithm.

17. The computer-readable medium according to claim 11, wherein
    the read command issuance step uses a throughput for the disks to determine a first load, uses the number of commands to be issued to the disks to determine a second load, and selects the algorithm based on the first and second loads.

18. The computer-readable medium according to claim 17, wherein the read command issuance step selects the algorithm based on the differences in the first and second loads between the two disks.

19. A control method for magnetic disk apparatus having a RAID configuration in which the same data is written on two disks, comprising:

a read command issuance step that selects an algorithm from a first algorithm that relates to the size of a load on a fiber channel (FC) loop and a second algorithm that relates to the size of a load applied to the magnetic disk apparatus and issues read commands to data stored in the two disks, respectively, according to the selected algorithm; and a data acquisition step that adopts, as read data, the data that has been read first by the read commands that the read command issuance step has issued to the two disks.

20. The control method for magnetic disk apparatus according to claim 19, wherein the read command issuance step determines two loads applied on the two disks, selects the algorithms used for read commands to be issued to the disks based on the determined loads, and issues read commands according to the selected algorithms.

* * * * *

UNITED STATES PATENT AND TRADEMARK OFFICE
CERTIFICATE OF CORRECTION

PATENT NO. : 7,487,292 B2
APPLICATION NO. : 11/214871
DATED : February 3, 2009
INVENTOR(S) : Yoshihito Konta et al.

It is certified that error appears in the above-identified patent and that said Letters Patent is hereby corrected as shown below:

First Page, Column 1 (Title), Lines 1-3, change "MAGNETIC DISK APPARATUS, CONTROL METHOD AND CONTROL PROGRAM THEREFOR" to --MAGNETIC DISK APPARATUS, CONTROL METHOD AND CONTROL PROGRAM FOR SPEEDUP OF A RESPONSE TO A READ REQUEST--.

Column 1 (Title), Lines 1-3, change "MAGNETIC DISK APPARATUS, CONTROL METHOD AND CONTROL PROGRAM THEREFOR" to --MAGNETIC DISK APPARATUS, CONTROL METHOD AND CONTROL PROGRAM FOR SPEEDUP OF A RESPONSE TO A READ REQUEST--.

Signed and Sealed this

Fourteenth Day of April, 2009

JOHN DOLL
*Acting Director of the United States Patent and Trademark Office*